Sept. 25, 1962 L. O. BRASH 3,055,348
FLUID HEATER TUBE PLATEN SUPPORTS
Filed April 10, 1959
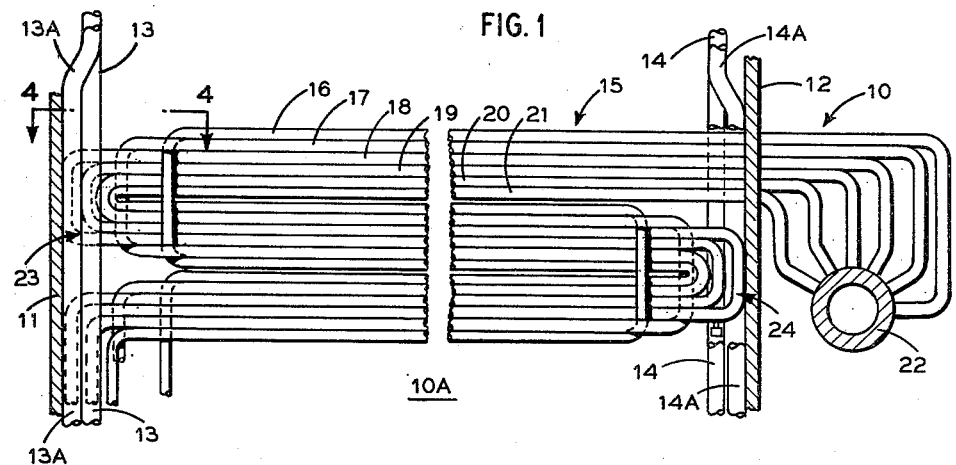
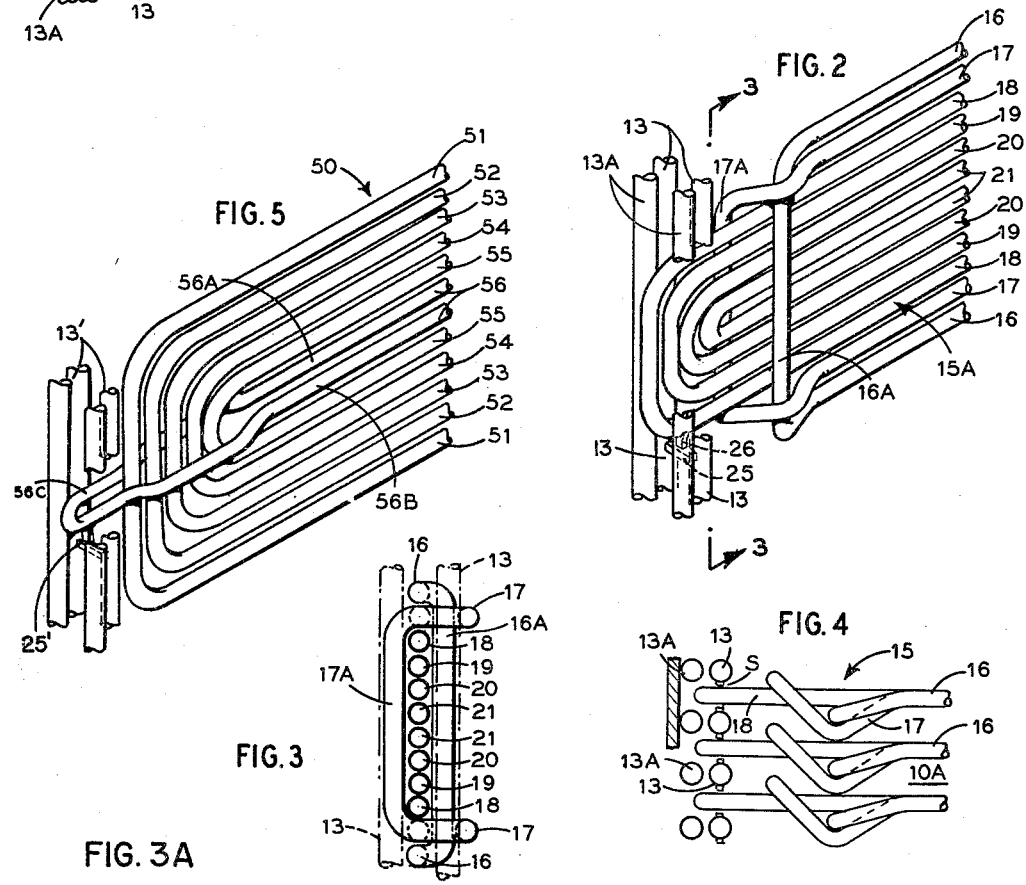
INVENTOR.
Leslie O. Brash
BY
ATTORNEY United States Patent Office 3,055,348
Patented Sept. 25, 1962

3,055,348
FLUID HEATER TUBE PLATEN SUPPORTS
Leslie O. Brash, Barberton, Ohio, assignor to The Babcock & Wilcox Company, New York, N.Y., a corporation of New Jersey
Filed Apr. 10, 1959, Ser. No. 805,425
5 Claims. (Cl. 122—510)

This invention relates generally to fluid heaters and more particularly to a novel arrangement and construction of a tubular vapor heater or the like and a support therefor for use in a vapor steam generator.

Heretofore, superheaters and the like formed of nested return bend tubes as a platen element and adapted to span a gas pass were generally end supported on opposed upright fluid cooled wall tubes, by means of complementary support attachments externally welded to the return bend of the platen element and the adjacent wall support tube, respectively. As such platen elements were end supported with the return bend portions thereof disposed inwardly of their respective supporting wall tubes, lateral guide attachments were frequently required to be welded to an exterior portion of the nested tubes in order to laterally stabilize intermediate portions of the platen element, particularly where the number of nested tubes were twelve or more tubes.

Experience has shown that the welding of any external attachments directly to the platen element either for end supporting or for laterally stabilizing the same was not entirely satisfactory; particularly where the platen tubes and attachments thereto were made of dissimilar materials and exposed to high temperature heating gases. It has been noted that such end supported platens loaded the end support attachments with an eccentric moment arm, which coupled with the exposure to the high temperature heating gases induced severe mechanical and thermal stresses in the support attachments. As a result, the useful life of externally connected support attachments was relatively very short, thereby requiring constant maintenance and repair.

Also, experience has shown that the deleterious effect due to high temperatures on such attachments was further aggravated in oil fired units by excessive corrosion, which is attributed to the action of impurities, such as vanadium pentoxide, present in the fuel oils, when metal temperatures of the attachments exceed 1100° F.

An object of this invention is to overcome the foregoing difficulties by providing an improved and novel fluid heater arrangement which comprises a plurality of nested return bend tubes arranged to form a platen having its end portion extending into spaces formed between adjacent pairs of upright support tubes only a limited extent and supported therebetween without resorting to any external supporting attachments connected directly to the surfaces of the platen.

Another object is to provide a novel tubular platen element which is arranged and constructed so as to be laterally self-stabilizing at an intermediate portion between its supported ends.

A feature of this invention resides in the provision that for relatively deep platens, e.g. formed of twelve tubes or more, the length of the nested tube loops extended between the wall support tubes is greatly minimized, thereby greatly simplifying the sealing problem thereat in pressure fired units.

Another feature of this invention resides in that the improved platen element and support therefor is relatively simple in construction, easily fabricated and positive in operation.

For a better understanding of the invention, its operating advantages and specific objects attained by its use, reference should be had to the accompanying drawings and descriptive matter in which there is illustrated and described preferred embodiments of my invention.

In the drawings:

FIG. 1 is a sectional side elevation view taken through a gas pass of a steam generator.

FIG. 2 is an enlarged detail end view taken in perspective illustrating an improved platen construction and support therefor.

FIG. 3 is a sectional view taken along line 3—3 of FIG. 2 and illustrating the supporting tubes in phantom.

FIG. 3A is a detail of the tube support shown in FIG. 2.

FIG. 4 is a sectional plan view taken along line 4—4 of FIG. 1.

FIG. 5 is a detail end view taken in perspective of a modified platen construction and support therefor.

Referring to FIG. 1, there is illustrated an upper heat absorbing portion or gas pass 10A of a high temperature, high pressure steam generator setting 10 of a type described in a co-pending application Serial Number 648,573 filed March 26, 1957, now U.S. Patent No. 2,931,-345. Generally, the setting 10 includes opposed front and rear walls 11 and 12 lined with upright steam generating tubes 13 and 14, respectively, which are connected into the fluid circulating system of the generator. The lower portions of tubes 13 and 14 extend downwardly to define opposed wall portions of a radiation or furnace chamber (not shown) while the upper extensions thereof form opposed boundaries of the gas pass section 10A. Fuel is introduced into the lower portion of the furnace or radiation chamber and the gaseous products of combustion generated therein flow upwardly therefrom and through the gas pass 10A.

Disposed in the gas pass section 10A are a plurality of vapor heating elements, such as vapor superheaters and/or reheaters. These elements consist essentially of tubular platen elements 15, formed of serially connected banks of return bend tubes disposed in vertical planes spaced horizontally across the gas pass 10A. Each platen element 15 includes a plurality of horizontally extending return bend or multiple loop tubes 16, 17, 18, 19, 20 and 21 connected to an inlet steam header 22 and an outlet steam header (not shown) for a parallel fluid flow therebetween.

According to this invention the arrangement of each of the platen elements 15 is such that it can be readily end supported and laterally stabilized without resorting to the use of any extraneous, externally connected, supporting or guiding attachments. As shown in FIGS. 1 to 4, a corresponding portion 13A, 14A of the tubes 13 and 14 in the front and rear walls 11 and 12, respectively, of the gas pass are displaced laterally and to one side to provide opposed wall spaces S in the row plane of tubes 13, 14. Thus adjacent pairs of tubes 13 and 14 in each of the walls 11 and 12, respectively, function as the support tubes for the platen elements 15 to be described. In the illustrated embodiment the width of the spaces S formed between adjacent pairs of support tubes 13, 14 is sufficient to accommodate the tube diameter of at least one platen element.

As shown, tubes 16 to 21 forming the platen elements 15 extend from the inlet steam header 22 and pass through the wall 12 of the gas pass 10A as horizontally extending, nested tube straights disposed in a vertical plane. These nested tube straights extend across the gas flow pass 10A to a point adjacent the opposite wall 11 where they are reversely bent or looped to extend again as nested tube straights horizontally across the gas pass toward wall 12 at a lower elevation and in the same plane. Adjacent the wall 12 the extensions of tubes 16 to 21 are again reversely bent to extend toward wall 11. Thus the platen described is formed with opposed return bend portions 23, 24 by which the platen 15 is end supported on adjacent pairs of support tubes 13, 14, respectively. The frequency or sequence with which the opposed return bends 23, 24 occur or are repeated depends on the particular design consideration of the unit.

According to this invention, each platen element 15 is aligned with respect to opposed spaces S so that the return bend portions, e.g. 23, 24, of the platen are arranged to extend into the spaces formed between adjacent pairs of support tubes 13, 14, and be supported therebetween in the manner to be described.

Referring to FIGS. 1 to 4, each of the opposed return bend portions 23 and 24 of platen 15 is end supported by extending the third tube from the top of the nested tube straights adjacent each of the respective return bend end portions 23, 24, e.g. tube 18, as viewed in FIGS. 2 to 4, into the space S formed between a pair of support tubes 13 and looping the same over a bridge casting 25 which is supported by and between the adjacent support tubes 13, 14 as by welding. Thus the end portion of the platen is simply supported by resting on the bridge casting 25. As shown, an intermediate support lug 26 on the tube 18 loosely fits into a transverse notch 26A in the bridge casting 25 to facilitate relative movement of the platen relative to its support during expansion and contraction thereof. The other return bend tubes 19 to 21 inside of the supported return bend tube 18 are supported by resting one on the other on the supported loop 18.

In order to laterally stabilize the nested tubes 16 to 21 which form a platen tube bank 15A of twelve tubes deep, the first tube 16 at the top of the bank 15A is laterally bent to one side, e.g. the right side, of the nested tube straights approximately one tube diameter, and then looped downwardly so that the bend 16A is disposed alongside the nested tube straights of return bend tubes 18 to 21 in embracing relationship therewith. At the bottom of the tube bank 15A, tube 16 is brought back into the plane of the platen in its normal bottom tube position.

The nested tube 17, second from the top of the tube bank 15A, is likewise bent laterally to the same or right side of the platen approximately two tube spaces and is then brought over across the tube bend 16A which extends vertically downward on the right side of the bank. Upon crossing over tube bend 16A, tube 17 is laterally bent to extend to the other or left side of the platen one tube diameter, as seen in FIG. 3, where is loops downwardly as bend 17A along the left side of nested return bend tube straights 18 to 21 to a point where it assumes the second tube position from the bottom of bank 15. At this point the tube is laterally bent to extend through the plane of the platen and to the right side of the tube bank 15A at least two tube diameters from whence it is brought into its normal position after crossing over the tube bend 16A at the bottom of the tube bank. With this arrangement tubes 16 and 17 are interlocked with respect to one another. In this arrangement described, the tube bank 15A is guided and stabilized by the interlocking tubes 16, 17, one on each side of the tube bank, which also tightly lock the tubes in the bank, and partly by the adjacent supporting tubes 13, 14. Thus any extraneous lugs or supporting attachments secured externally of the tubes are not required. Also the nested tubes are free to move for accommodating both expansion and contraction thereof.

FIG. 5 illustrates a modified embodiment of the invention for supporting and stabilizing opposed end portions of a nested tube platen.

In this form the platen element 50 is formed of nested, horizontally extending, return bend tubes 51 to 56 which may serially be connected with repeating frequencies as may be required by particular design consideration, as hereinbefore described.

In this form of the invention the return bend portion of platen element 50 is end supported and laterally stabilized by extending the straights 56A, 56B of the innermost tube 56 laterally one tube diameter to opposite sides of the nested bends of tubes 51 to 55. Beyond the nested tube bends the extension of straights 56A, 56B are then brought back into the plane of the element, with the planar portion 56C extended between adjacent support tubes $13^1$, to rest on or be supported by a support casting $25^1$ as hereinbefore described. The weight of the tubes 51 to 55 in turn is supported on the supported straights 56A of the inner tube 56. With this arrangement the nested return bend end portions are supported and stabilized by the embracing laterally disposed portions of tube straights 56A, 56B.

An important feature of this invention is that the opposed return bend portions, e.g. 23, 24 of FIGS. 1 to 4 or 56C of FIG. 5, of the platen need not extend beyond the plane of tube rows 13, 14. Because the return bend loops need not be extended beyond the walls 11, 12 of the setting 10, as would be otherwise required for relatively deep platens which are guided solely by the wall tubes 13, 14, the problem of sealing and encasing the wall tubes is greatly simplified.

The forms of platen element described can be used on any bank of tubes of six tubes deep and up; the limiting condition being the ability of the one supported loop or tube, e.g. tube 18 in the illustrated embodiment of FIG. 2 or tube 56 of the embodiment of FIG. 5, to carry the weight of all the other tubes. The horizontal spacing between tube platens 15 is limited to the side spacing necessary to clear the interlock tubes from each other in the adjacent banks. To further reduce the required horizontal spacing for the embodiment shown in FIGS. 1 to 4, the location of the interlocking tubes can be staggered in adjacent spaced platens.

The fabrication of the described embodiment is simple and even implemented by the interlocking tube construction. For example, the loops 16A, 17A may be welded to their respective tube straights after the entire bank 15A has been assembled. The arrangement also facilitates shipment of the platen as an assembled unit in that the interlocking tubes 16, 17 function as strong backs for the nested tubes. This would also be true of the form illustrated by FIG. 5.

With the arrangements described it will be noted that the bridge casting 25 and auxiliary support lug 26, are disposed out of the main gas stream, and thus are not exposed to the direct action thereof. As a result the erosive and corrosive action to which they would be otherwise subjected is minimized. Also it is pointed out that the bridge support 25 is connected directly to support tubes 13, 14 which are water cooled. Therefore the support 25 is maintained relatively cool. Thus the useful life of the support castings is materially extended, and thereby greatly minimizes the cost of maintenance, repair or replacement of the same accordingly.

While the instant invention has been disclosed with reference to particular embodiments thereof, it is to be appreciated that the invention is not to be taken as limited to all of the details thereof as modifications and variations thereof may be made without departing from the spirit or scope of the invention.

What is claimed is:

1. A fluid cooled tubular platen element adapted to be exposed to high temperature heating gases comprising a plurality of substantially co-planar return bend tubes having their return bends and connected tube straights in nested position relative to one another, and an outermost pair of tubes having laterally disposed return bends and co-planar superimposed straight segments, said pair of tubes having their respective straight segments co-planar with respect to said nested tube straights, and said laterally disposed bends of said pair of tubes being oppositely extended on either side of said nested tubes for embracing the same to prevent lateral displacement of said nested tubes while maintaining freedom of longitudinal movement of said tubes during expansion and contraction thereof, portions of the straight segments of one of said outermost pair of tubes being laterally disposed out of the plane of said platen element to the same side of said platen element as said laterally disposed return bend of said other tube of said tube pair and crossing over the return bend of said other tube and thence being laterally bent to extend to the other side of said platen element so that said pair of tubes are interlocked with respect to one another with the respective bend portions thereof being disposed on either side of said nested tubes in embracing relationship therewith.

2. A fluid heater arrangement adapted to be subjected to high temperature heating gases comprising in combination, oppositely disposed rows of spaced fluid cooled support tubes defining opposite boundary walls of a gas flow path, a platen element formed of a plurality of substantially co-planar nested multiple looped tubes having opposed outer bends and connected superimposed leg portions extending across the gas flow path, said opposed outer bends of said platen element each being extended into a space formed between adjacent support tubes in one of said boundary walls and supported therebetween, and a pair of return bend tubes having co-planar leg segments in nested relationship to the leg portions of the nested tubes, said leg segments of each return bend tube having connected bend portions disposed inwardly of said walls, said latter bend portions of said tube pair being laterally disposed to extend to opposite sides of said nested tube legs and in embracing relationship therewith to provide lateral support and freedom of movement for said nested tubes during expansion and contraction thereof, a portion of one of said pair of return bend tubes crossing over a portion of the other tube of said pair of return bend tubes out of the plane of said platen and to one side thereof for interlocking the superimposed tube legs of said nested tubes between the oppositely disposed return bend portions of said pair of return bend tubes.

3. A tubular platen adapted to be heated by high temperature heating gases comprising a plurality of substantially co-planar nested tubes having opposed return bend end portions, the outermost pair of said nested tubes intermediate the ends of said platen each having a respective portion thereof laterally displaced out of the plane of said platen to extend to the same side of said platen, a portion of one of said laterally displaced outermost tube pair crossing over a portion of the other of said tube pair out of the plane of said platen and thence laterally bent to extend to the other side of said platen for interlocking the tubes of said outermost pair of tubes with respect to one another, and said pair of tubes having their respective return bend end portions laterally displaced out of the plane of said platen so as to be disposed on either side of said platen intermediate the end portions of said platen, each of said laterally displaced return bend portions extending transversely of the remaining co-planar nested tube portions of said platen for embracing the same to provide lateral support therefor while permitting freedom of longitudinal movement of the embraced co-planar tubes during expansion and contraction of said platen.

4. A fluid cooled tubular platen element adapted to be exposed in heat transfer relationship to a flow of heating gases comprising a plurality of horizontally disposed substantially co-planar return bend tubes having return bend end portions and connected straight portions in nested position relative to one another, said nested tubes being successively supported one on the other, and an outer pair of return bend tubes having superposed straight segments and connected return bends, said superposed straight segments being in co-planar alignment with the straight portions of said nested tubes, each tube of said outer pair of tubes having portions thereof laterally disposed out of the plane of said platen and to one side thereof, and one of said pair of laterally displaced tube portions crossing over the laterally displaced portion of said other of said tube pair and thence laterally bent to extend to the other side of said platen so as to form for interlocking said tube pair with respect to one another, and said outer pair of tubes having their respective return bends oppositely disposed out of the plane of said platen in embracing relationship with the straight portions of said co-planar nested tubes on either side thereof to provide a lateral restraint therefor while permitting freedom of longitudinal movement of said embraced tube portions during expansion and contraction.

5. A fluid heater adapted to be exposed in heat transfer relationship to a flow of heating gases, comprising a platen element including a plurality of substantially co-planar nested multi-looped tubes having opposed outer return bends and connected superposed leg portions adapted to extend horizontally across a gas flow path, and a pair of return bend tubes having co-planar leg segments disposed in nested relationship to the leg portions of said nested tubes, said co-planar leg segments of said pair of tubes being laterally bent out of the plane of said platen and to the same side thereof whereby a bent leg segment of one tube of said pair of tubes crosses over the bent leg segment of the other tube of said pair of tubes out of the plane of said platen on the same side thereof, and said one tube of said pair thence extended to the other side of said platen, and each of said leg segments of said pair of tubes having their connected return bend portion disposed inwardly of the opposed outer return bends of said platen, and said connected return bend portions of said leg segments being laterally displaced on opposite sides of said nested tube leg portions so as to embrace the leg portions of said nested tubes therebetween to provide lateral support and freedom of longitudinal movement of said nested leg portions during expansion and contraction thereof.

References Cited in the file of this patent

UNITED STATES PATENTS

| 1,889,861 | Huet | Dec. 6, 1932 |
| 1,894,692 | Kerr et al. | Jan. 17, 1933 |
| 2,067,671 | Kooistra | Jan. 12, 1937 |
| 2,308,762 | Krug et al. | Jan. 19, 1943 |
| 2,779,316 | Meigs et al. | Jan. 29, 1957 |
| 2,851,017 | Blaskowski | Sept. 9, 1958 |
| 2,897,794 | Otto et al. | Aug. 4, 1959 |

FOREIGN PATENTS

| 313,803 | Great Britain | June 20, 1929 |
| 898,090 | France | Apr. 10, 1945 |
| 1,046,816 | France | Dec. 9, 1953 |